(12) United States Patent
Stanciu et al.

(10) Patent No.: US 12,040,846 B2
(45) Date of Patent: Jul. 16, 2024

(54) DISTANCE QUALITY INDICATOR (DQI) FOR PHASE-BASED DISTANCE ESTIMATION USING NARROWBAND RADIOS

(71) Applicant: NXP USA, Inc., Austin, TX (US)

(72) Inventors: Mihai-Ionut Stanciu, Bucharest (RO); Khurram Waheed, Austin, TX (US); Olivier Jean, Roquefort les Pins (FR)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 17/934,336

(22) Filed: Sep. 22, 2022

(65) Prior Publication Data

US 2024/0113792 A1   Apr. 4, 2024

(30) Foreign Application Priority Data

Jun. 24, 2022   (RO) .............. a 2022 00360

(51) Int. Cl.
*H04W 64/00* (2009.01)
*H04B 17/10* (2015.01)
(Continued)

(52) U.S. Cl.
CPC ......... *H04B 17/309* (2015.01); *H04B 17/102* (2015.01); *H04L 27/265* (2013.01)

(58) Field of Classification Search
CPC ...... H04B 3/20; H04B 1/7075; H04B 1/7107; H04B 1/71072; H04B 7/005; H04B 1/709; H04B 1/711; H04B 10/07951; H04L 5/0048; H04L 5/005; H04L 5/0051; H04L 5/0053; H04L 5/001; H04L 25/0224; H04L 5/0007; H04L 5/0094; H04W 64/00; H04W 4/023; H04W 64/006; H04W 4/029;
(Continued)

(56) References Cited

U.S. PATENT DOCUMENTS 7,239,277 B2   7/2007   Fullerton et al.
8,265,011 B2   9/2012   Sugar et al.
(Continued)

FOREIGN PATENT DOCUMENTS

EP   2679064 B1   1/2015

OTHER PUBLICATIONS

Stanciu, et al., "Accurate Distance Measurement Using Narrowband Systems," 2021 IEEE International Midwest Symposium on Circuits and Systems (MWSCAS), IEEE, Aug. 9-11, 2021, DOI: 10.1109/MWSCAS47672.2021.953187, MI, USA, pp. 937-940.

*Primary Examiner* — Eva Y Puente

(57) ABSTRACT

Systems and methods for producing quality indicators for phase-based distance estimations using narrowband radios are described. In an illustrative, non-limiting embodiment, a device may include: a processor; and a memory coupled to the processor, the memory having program instructions stored thereon that, upon execution by the processor, cause the device to: measure a transfer function of a radio frequency (RF) channel between the device and another device using narrowband radios; estimate a distance between the device and the other device based, at least in part, upon the transfer function; and determine a Distance Quality Indicator (DQI) corresponding to the distance based, at least in part, upon an evaluation of a spectral lobe of the transfer function.

20 Claims, 8 Drawing Sheets

(51) Int. Cl.
*H04B 17/309* (2015.01)
*H04L 27/26* (2006.01)

(58) Field of Classification Search
CPC ... H04W 24/10; H04W 24/08; H04W 64/003; H04W 4/80
USPC .......................................................... 375/262
See application file for complete search history.

(56) References Cited

U.S. PATENT DOCUMENTS

| | | |
|---|---|---|
| 8,711,038 B2 | 4/2014 | Reede et al. |
| 9,338,665 B2 * | 5/2016 | Zhang ........................ G01S 5/14 |
| 9,612,325 B2 * | 4/2017 | Taylor, Jr. ................ G01S 13/84 |
| 10,182,414 B2 * | 1/2019 | Qiu ...................... H04W 64/006 |
| 10,809,349 B2 | 10/2020 | Syrjärinne et al. |
| 10,935,626 B2 * | 3/2021 | Van Den Dungen ........................ G01S 5/0226 |
| 2016/0102964 A1 * | 4/2016 | Fessler ............... G06K 7/10128 702/158 |
| 2017/0212234 A1 * | 7/2017 | Heath ...................... G01S 13/08 |
| 2018/0356490 A1 * | 12/2018 | Van Den Dungen ........................ G01S 5/0226 |
| 2021/0185536 A1 * | 6/2021 | Agarwal ............... H04W 48/16 |
| 2022/0066019 A1 | 3/2022 | Waheed et al. |
| 2023/0106576 A1 * | 4/2023 | De Vegt .................. G01S 7/006 455/456.2 |

* cited by examiner

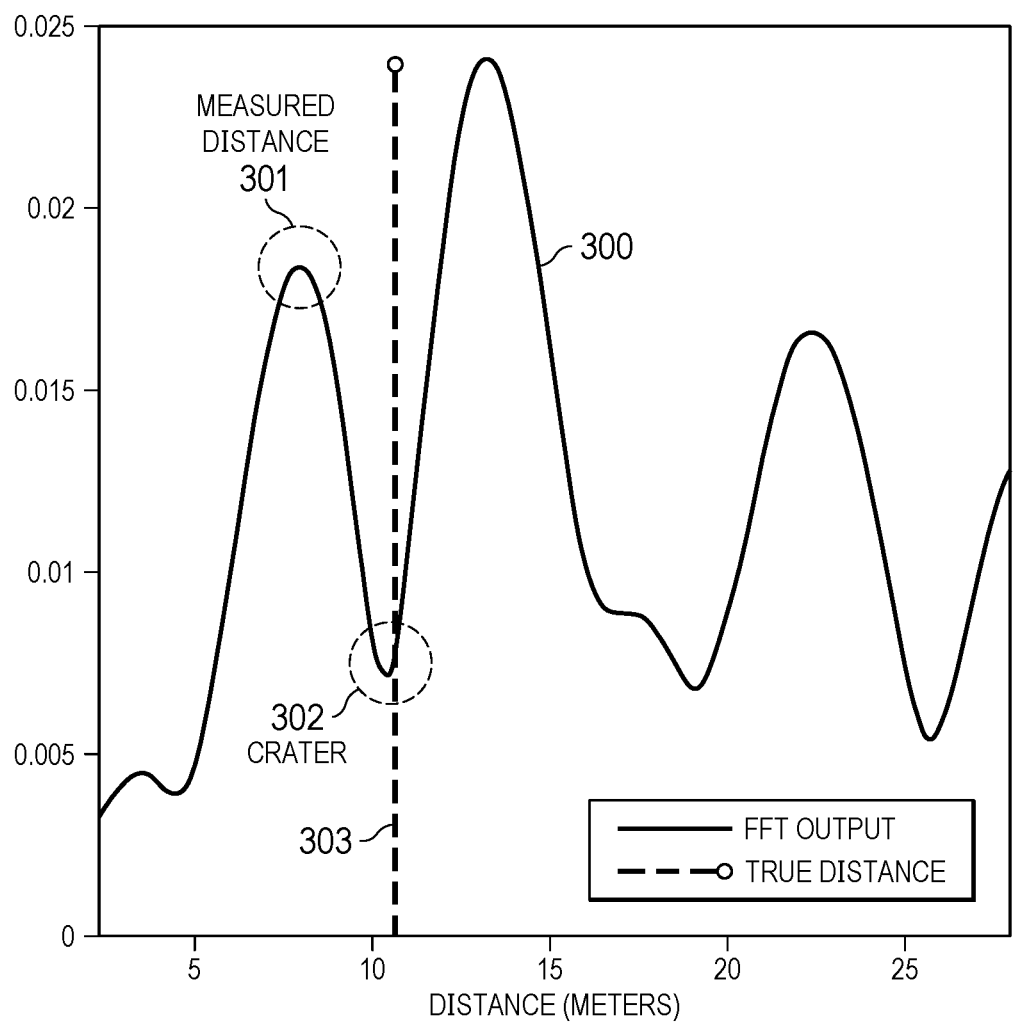

DISTANCE QUALITY INDICATOR (DQI) FOR PHASE-BASED DISTANCE ESTIMATION USING NARROWBAND RADIOS

CROSS-REFERENCE TO RELATED APPLICATIONS

This application claims the priority under 35 U.S.C. § 119 of Romania application no. A202200360, filed on 24 Jun. 2022, the contents of which are incorporated by reference herein.

FIELD

This disclosure relates generally to wireless ranging and localization, and more specifically, to systems and methods for producing Distance Quality Indicators (DQIs) for phase-based distance estimation using narrowband radios.

BACKGROUND

The next generation of Internet-of-Things (IoT) applications requires access control by enforcement of security perimeters and enablement of location-aware services. This is propelling the industry to develop accurate ranging and localization solutions. Various wideband and narrowband technologies are being considered for the purpose of localization, each having their pros and cons. At the application level, localization can be achieved by performing direction finding (triangulation), measuring the distance with a system of anchors (trilateration), or combining distance measurement with direction finding.

Low-cost narrowband wireless devices in the 2.4 GHz Industrial, Scientific and Medical (ISM) frequency bands using BLUETOOTH-LE (BLE) and/or Institute of Electrical and Electronics Engineers (IEEE) 802.15.4 standards are being deployed in the fast-growing applications of IoT. BLUETOOTH technology has the advantage of being widely available in smartphones, which enables a convenient and low-cost connectivity solution with a variety of smart BLE-enabled devices, sensors, and smart edge-nodes in a diverse set of IoT applications.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

FIG. 3 shows a graph illustrating examples of Fast Fourier Transform (FFT)-based distance measurements producing a crater scenario, according to various embodiments.

DETAILED DESCRIPTION

In wireless ranging and localization applications, viable, low-cost, low-power alternatives to WiFi and Ultra-wideband (UWB) systems include the 2.4 GHz Industrial, Scientific and Medical (ISM) band narrowband systems. Owing to their narrow bandwidth, however, the native spatial resolution of narrowband systems is significantly lower. Sub-GHz technologies are not good localization candidates because of their limited available bandwidth and the global diversity in the frequency bands that can be used. Hence, to be competitive as ranging and localization technologies, 2.4 GHz narrowband systems employ techniques like multiple packet exchanges, multicarrier measurements, and super-resolution algorithms for distance estimation.

Conventional techniques that use BLUETOOTH radios to estimate distances have traditionally used Received Signal Strength Indicator (RSSI) measurements. However, instantaneous received signal power estimations are prone to significant errors due to multi-path reflections, shadowing, imperfect matching, calibration of the antenna system, Fresnel zones, ambiguity in the radio frequency (RF) front-end gains, etc. Therefore, RSSI-based distance measurements require a significant number of measurements and sophisticated tracking algorithms to yield good performance.

A more robust alternative for measuring distances with BLUETOOTH radios is to use round-trip time (RTT). For narrowband systems, however, RTT is associated with low spatial resolution which renders the distance measurement biased in reflective environments.

An elegant way to improve the native spatial resolution of a narrowband system is to use multiple narrowband channels to measure the bilateral phase between two nodes, an initiator device and a reflector device. In some implementations, a Narrowband Multi-Carrier technique may be used whereby all channels of a BLUETOOTH Low-Energy (BLE) radio system, within the 80 MHz ISM band, are used for the distance measurement. Information is sequentially collected, while hopping through all available 2 MHz narrowband channels. This way, a BLUETOOTH narrowband system can achieve a 40-fold increase in spatial resolution.

Figure 1:
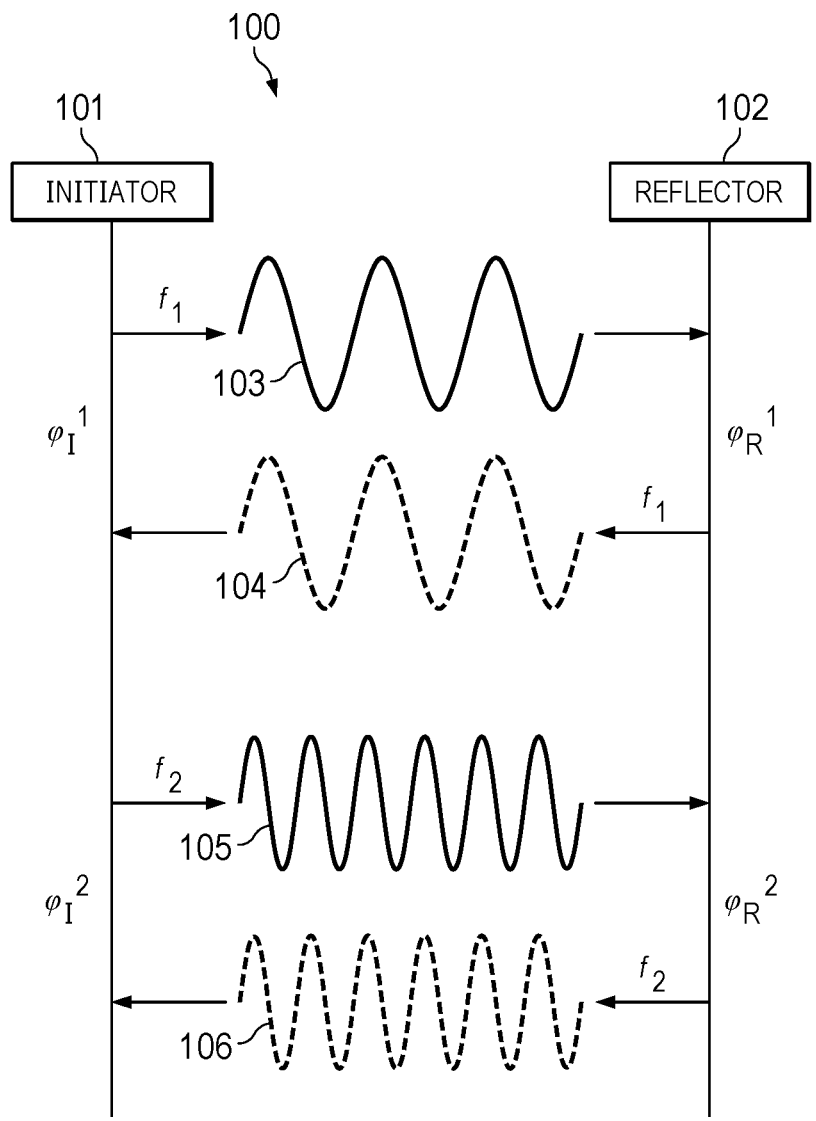
FIG. 1 illustrates an example of a narrowband radio system configured to perform a distance estimation using multiple channels to measure the bilateral phase between two devices, according to various embodiments.

FIG. 1 illustrates an example of narrowband radio system 100 configured to perform a distance estimation using multiple channels to measure the bilateral phase between two devices 101 and 102, according to various embodiments. Initiator device 101 and reflector device 102 may include any electronic device equipped with a narrowband radio. For example, in some applications, initiator device 101 may include a motor vehicle, whereas reflector device 102 may include a key fob, smartphone, tablet, or laptop.

Narrowband radio system 100 achieves enhanced spatial resolution by concatenating information from as many narrowband channels as possible. For each RF channel, at 103 a first tone ($f_1$) is transmitted by initiator device 101 and received by reflector device 102. Following 103, reflector device 102 measures one or multiple In-phase and Quadrature (IQ) samples captured in the baseband stage.

If both devices 101 and 102 are tuned precisely to the same frequency, in the absence of noise and reflections, the equation of the received signal on channel k, is:

$$iq_R^k = \exp(j(\Delta\varphi^k + \varphi_I^k - \varphi_R^k))$$

where $\varphi_I^k$ and $\varphi_R^k$ are the initial phases of the local oscillators (LOs) of initiator device 101 and reflector device 102, and $\Delta\varphi^k$ is the phase shift introduced by the propagation.

At 104, in a complementary measurement, reflector device 102 transmits the first tone ($f_1$) on the same RF channel back to initiator device 101, and initiator device 101 samples the IQ values after down-conversion. The equation of the received signal at the initiator side, again ignoring noise and reflections, is:

$$iq_I^k = \exp(j(\Delta\varphi^k + \varphi_R^k - \varphi_I^k))$$

If initiator device 101 and reflector device 102 are perfectly synchronized in frequency, the two equations above are independent of time because the mixing between the tone received on the antenna and the LO is perfect. In that case, $\Delta\varphi^k$ contains the distance information:

$$\Delta\varphi k = 2\pi f k D/c$$

where fk is the RF frequency associated with channel k, c is the radio wave propagation speed (i.e., the speed of light in air), and D is the distance between initiator device 101 and reflector device 102. The initial phases of the LOs of initiator device 101 and reflector device 102 can be removed by using equation:

$$iqk = iqIk * iqRk = \exp(j(2\Delta\varphi k))$$

Note that frequency misalignment between the two devices can introduce a time dependency of φIk and φRk, with which φIk and φRk does not cancel out.

For a BLUETOOTH system that uses frequencies in the 2.4 GHz band, the phase term rolls over approximately every 12.5 centimeters. Consequently, the distance measurement range is limited to 12.5 cm, which is not useful in practice. To increase this range, multiple frequencies may be used.

Particularly, the RF tone exchange process described above may be repeated at 105 and 106, but this time for a second tone $f_2$. To increase the range, the following equation can be used:

$$iqk1,k2 = iqk1 * \text{conj}(iqk2) = \exp(j(2(\Delta\varphi k1 - \Delta\varphi k2))) = \exp(\square(2\Delta\square k1,k2))$$

where "conj" represents the complex conjugate. The differential phase shift due to propagation is given by:

$$\Delta\varphi k1,k2 = 2\pi(fk1 - fk2)D/c$$

As such, the range depends on the difference between $f_1$ and $f_2$. In the case of BLE, the difference between consecutive channels is 2 MHz. Thus, the maximum achievable range is 150 meters. More generally, the range is given by the frequency resolution of the RF channels, while the native spatial resolution is given by the aperture. For the same BLE example, the aperture is BWISM=80 MHz, which results in a spatial resolution of c/BWISM=3.75 m. This means that two propagation paths closer than 3.75 m cannot be separated without using a super-resolution approach. In some implementations, 80 tones may be used in the 2.4 band, 1 MHz apart from each other (i.e., $f_k$=2.4 GHz+k*1 MHz, where k={1, 2, . . . , 80}).

If the RF channels are uniformly spaced, with a spacing Δf, based upon the simplifying assumption that the channel has no noise and no reflections, the expected input to the distance estimation algorithm follows:

$$iq^k = (\exp(j(2\pi(f_0 + k\Delta f)D/c))), k=0,K-1$$

Usually, super-resolution algorithms require root-squaring of $iq^k$ values in order to deliver good results. This creates additional complexity due to the sign ambiguity, which needs to be resolved within the square root operation. If the LOs of initiator device 101 and reflector device 102 have a predictable phase relationship from one frequency to another frequency, the combination of phases from two devices is not required. Thus, IQ values measured by any of the two devices can be used directly for the "one-way" distance measurement. This reduces the complexity involved in the de-squaring of the channel, but it imposes increased constraints on the RF frequency synthesis and tighter requirements on the timing accuracy.

In a non-reflective environment, both $iq^k$ and the square root of $iq^k$ have a linear phase variation (there is a linear dependency between the phase of $iq^k$ and frequency), which can be conveniently processed. Real-world scenarios, however, include reflective environments where there is an individual contribution of each propagation path, thus making the phase non-linear.

Figure 2A:
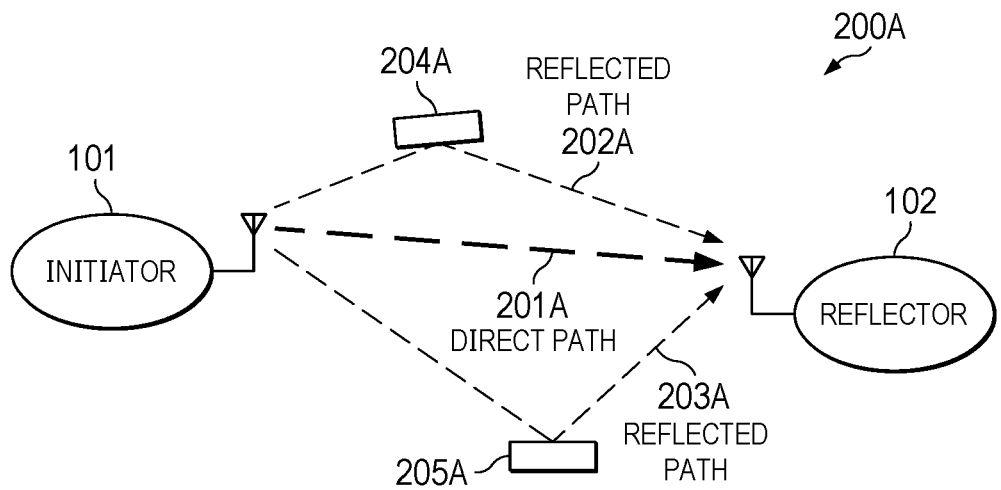
FIGS. 2A and 2B illustrate examples of a line-of-sight (LOS) and non-LOS (NLOS) multipath channels, according to various embodiments.
Figure 2B:
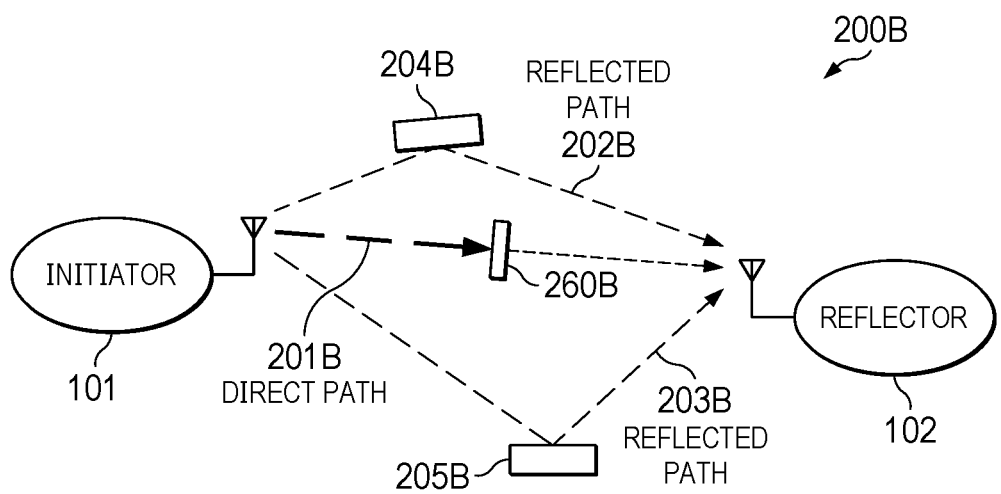

Particularly, FIGS. 2A and 2B show examples of a line-of-sight (LOS) and non-LOS (NLOS) multipath channels, according to various embodiments. In LOS scenario 200A of FIG. 2A, initiator device 101 has unobstructed direct path 201A to reflector device 102, as well as two reflected paths 202A and 203A off objects 204A and 205A, respectively. Direct path 201 is usually the propagation path with the largest received power level. In NLOS scenario 200B of FIG. 2B, direct path 201B is blocked by object 206B and only reflected paths 202B and 203B created by objects 204B and 205B, respectively, reach reflector device 102. As such, only a small portion of the power arrives at the reflector side.

In both scenarios 200A and 200B, each reflection contributes a complex exponential of the frequency depending on the propagation distance corresponding to a reflected propagation path. While for a linear channel (square root of $iq^k$) the reflections add up obeying superposition, for the squared channel this constitutes second order mixing of components, which severely limits the ability to filter out reflections.

Due to the harmonic nature of the $iq^k$ samples, spectral analysis techniques may be used to estimate the distance between initiator device 101 and reflector device 102. For example, a Fast Fourier Transform (FFT) algorithm may be applied to produce a transfer function in the frequency domain for the RF channel. An algorithm may perform an FFT on the $iq^k$ samples which, combined with a selection of peaks or spectral lobes, is capable of detecting multiple propagation paths when well separated, while maintaining robustness to lower the signal-to-noise ratio (SNR).

As a result, the following FFT outputs may be calculated:

$$X_n = \sum_{k=0}^{N-1} iq^k * e^{-j2\pi f_k * \frac{n}{F_s}}$$

In various embodiments described herein, an FFT-based distance estimation may select a local maximum associated to a lobe of the FFT magnitude. When system 100 deals with severe noise or strong reflectiveness, the shape of the spectrum in the vicinity of the selected lobe may be distorted.

For example, FIG. 3 shows a graph illustrating examples of FFT-based distance measurements producing a crater scenario, according to various embodiments. This scenario is due to destructive cancelation between close-in propagation paths. As shown in spectral curve or transfer function 300, peak 301 is selected as corresponding the estimated distance between initiator device 101 and reflector device 102. Because a strong reflection is present in this case, crater 302 is produced. As a result, although true distance 303 is 10.8 m, measured distance 301 is 7.8 meters.

Crater 302 is most likely to occur in an indoor environment. A non-limiting, example use-case includes an indoor parking lot where a motor vehicle's (e.g. initiator device 101) key fob or cell phone (e.g., reflector device 102) is in a user's back pocket, such that the direct propagation path is attenuated by the user's own body (e.g., object 206B in NLOS scenario 200B) and there is a metallic object (e.g., another vehicle 204B or 205B) in the vicinity. Crater 302 can lead to measuring a distance that, for 80 MHz bandwidth, is up to 4 meters smaller than the true distance, which presents a serious security flaw: if the true distance is 5 m, a man-in-the-middle attack can emulate a reflection point that makes the distance seem like 1 m, thus granting illegitimate access to the motor vehicle.

Figure 4A:
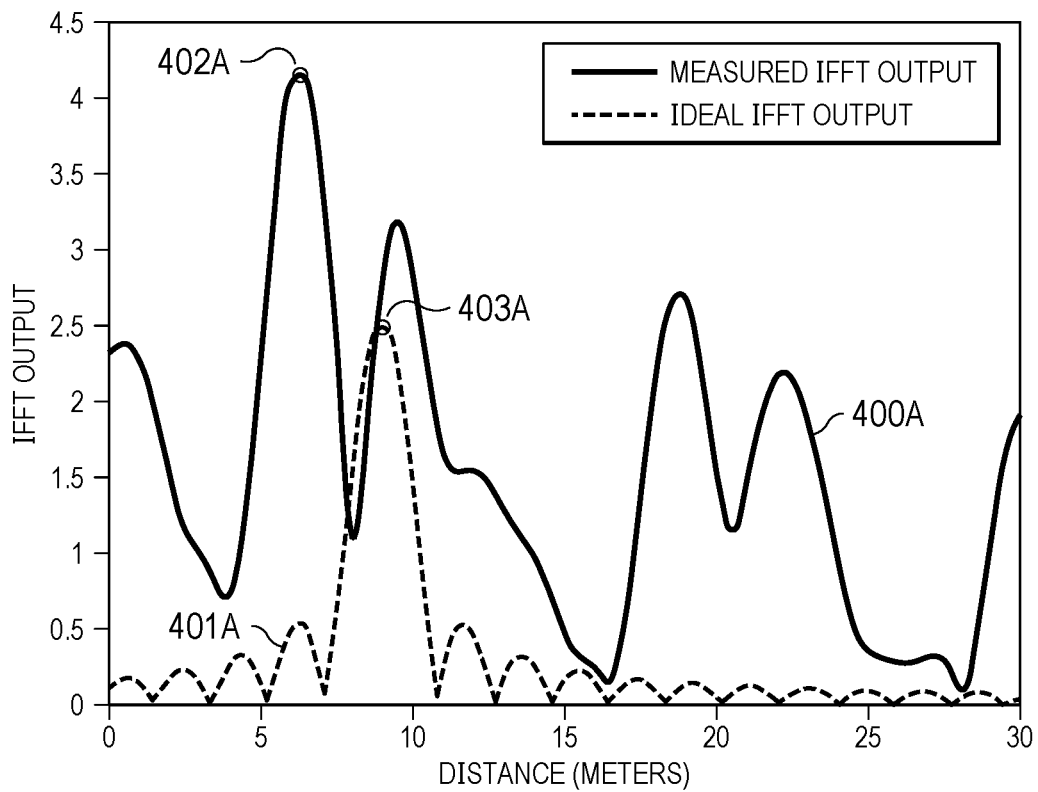
FIGS. 4A and 4B show graphs illustrating examples of FFT-based distance measurements with severe noise and strong multipath effects, according to various embodiments.
Figure 4B:
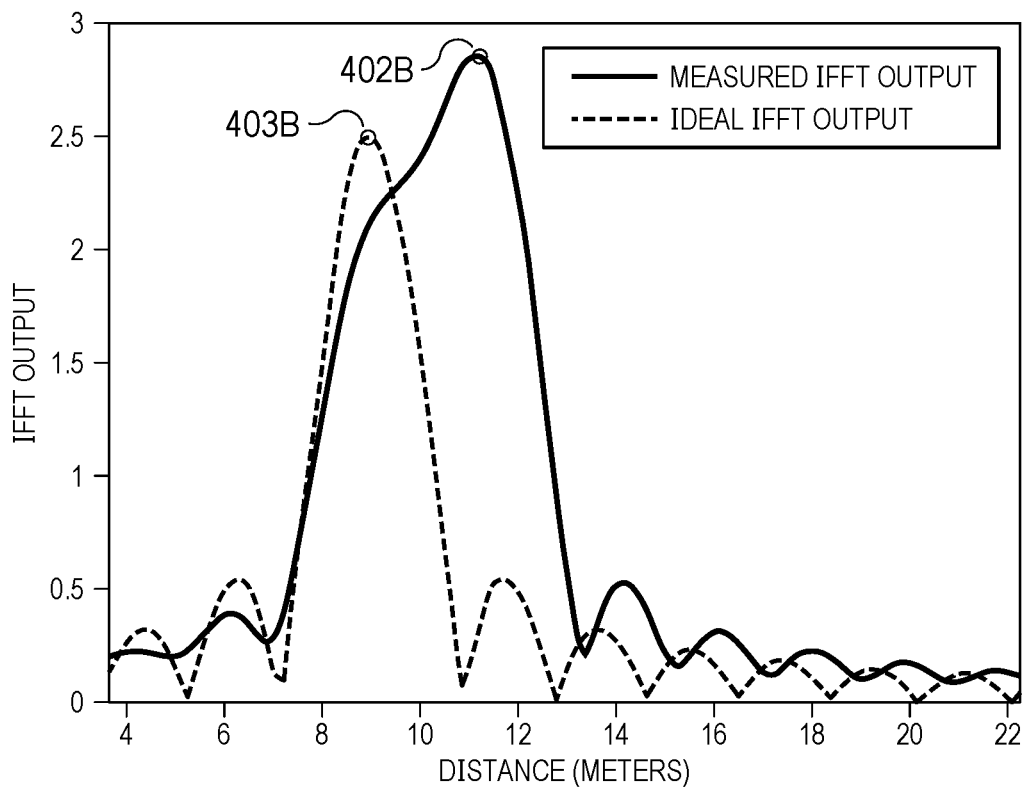

In addition to the crater scenario, FIGS. 4A and 4B show graphs 400A and 400B illustrating examples of FFT-based distance measurements with severe noise and strong multipath effects, respectively, according to various embodiments. In the severe noise case of FIG. 4A, FFT 400A includes lobe 402A, which is selected as corresponding to an estimated distance (6.3 m) between initiator 101 and reflector 102 different from the true distance (9 m) corresponding to lobe 403A of ideal channel 401A. Meanwhile, in the strong multipath case of FIG. 4B, FFT 400B includes lobe 402B, which is selected as corresponding to an estimated distance (11 m) between initiator 101 and reflector 102 different from the true distance (9 m) corresponding to lobe 403B of ideal channel 401B.

To address these scenarios, systems and methods described herein may calculate a Distance Quality Indicator (DQ) associated with the FFT-based distance estimation, at least in part, by evaluating a shape of a peak of the FFT corresponding to the distance. Initiator device 101 or reflector device 102 may characterize the estimated distance as inaccurate in response to the DQ being smaller than a threshold value, or as accurate in response to the DQ being greater than a threshold value. In some cases, in response to an estimated distance having a DQ that characterizes it as unreliable, initiator device 101 may not respond to a command issued by reflector device 102 or vice-versa (e.g., unlock a door, start an engine, etc.). In other cases, system 100 may estimate a new distance between initiator device 101 and reflector device 102, calculate a new DQ associated with the new distance estimation, and then calculate an average distance between initiator device 101 and reflector device 102 based upon an average between the original distance weighted by the original DQ and the new distance weighted by the new DQ.

To evaluate the shape of a peak of the FFT, systems and methods described herein may calculate at least one of: a magnitude Peak-to-Average Ratio (PAR) of the FFT, or a fitting error between the peak and a Sinc function.

To calculate a PAR-based DQ, initiator device 101 may, assuming a computed distance equal to D (associated to a local maximum of the FFT output), select a discrete interval (I) around the estimated distance such that I=[D−ΔD, D+ΔD]. For example, ΔD may be the spatial resolution of the FFT depending on bandwidth (BWN) and propagation speed (c), such that ΔD=c/BW.

Initiator device 101 may compute the average magnitude of the FFT outputs falling within interval I, as follows:

$$X_{avg} = \frac{1}{len(I)} \sum_{n=0}^{len(I)-1} |X_n|$$

where $X_n$ are the FFT outputs.

Then, initiator device 101 may compute the PAR as:

$$PAR = \frac{\max(|X_n|)}{X_{avg}}$$

Finally, initiator device 101 may normalize and bound the peak to average ratio to get the final DQ:

$$DQI = \begin{cases} 0, & \frac{PAR-a}{b} < 0 \\ \frac{PAR-a}{b}, & \frac{PAR-a}{b} \in [0,1] \\ 1, & \frac{PAR-a}{b} > 1 \end{cases}$$

Examples of suitable normalization parameters for BW=80 MHz (resolution is 3.75 m) are: ΔD=3.75 m, a=0.9, and b=2.

Conversely, to calculate a Sinc-fit-based DQ, initiator device 101 may, still assuming a computed distance equal to D (associated to a local maximum of the FFT output), also select a discrete interval (I) around the estimated distance such that I=[D−ΔD, D+ΔD]. For example, ΔD may be the spatial resolution of the FFT depending on bandwidth (BW) and propagation speed (c), such that ΔD=c/BW.

Then, initiator device 101 may compute an ideal Sinc function centered on the computed distance D:

$$X_n^{ideal} = \frac{1}{M} e^{j\pi(N-1)(\tau_0 F_s - \frac{n}{M})} \frac{\sin\left(\pi N \left(\tau_0 F_s - \frac{n}{M}\right)\right)}{\sin\left(\pi \left(\tau_0 F_s - \frac{n}{M}\right)\right)}$$

where $\tau_0$ is the propagation delay associated with D, N is the number of tones in the exchange, M is the FFT size, and $F_s$ is the frequency step. Alternatively, $X_n^{ideal}$ values may be precomputed and stored in an LUT.

Initiator device 101 may also find a scaling factor α as:

$$\alpha_{min} = \operatorname{argmin}\left(\sum_{n=0}^{len(I)-1} \left(|X_n| - \alpha |X_n^{ideal}|\right)^2\right)$$

Then, initiator device 101 may compute error ε as:

$$\varepsilon = \sum_{n=0}^{len(I)-1} \left(|X_n| - \alpha_{min}|X_n^{ideal}|\right)^2 \Big/ \sum_{n=0}^{len(I)-1} (|X_n|)^2$$

Finally, initiator device 101 may normalize and bound the error to obtain DQ:

$$DQI = \begin{cases} 0, & \frac{(1-\varepsilon)-a}{b} < 0 \\ \frac{(1-\varepsilon)-a}{b}, & \frac{(1-\varepsilon)-a}{b} \in [0, 1] \\ 1, & \frac{(1-\varepsilon)-a}{b} > 1 \end{cases}$$

Examples of suitable normalization parameters for BW=80 MHz (resolution is 3.75 m) are: ΔD=3.75 m, a=0.2, and b=0.8.

Figure 5:
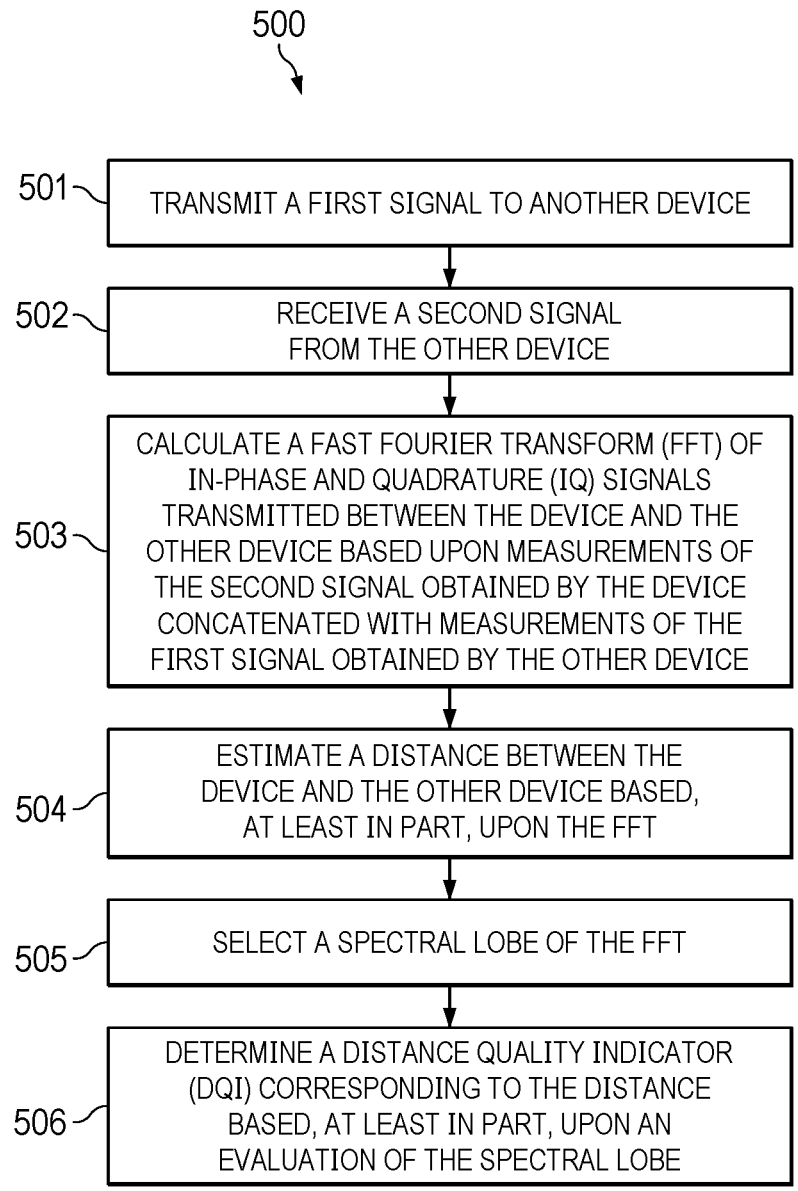
FIG. 5 shows a flowchart illustrating an example of a method for producing Distance Quality Indicators (DQIs) for phase-based distance estimation using narrowband radios, according to various embodiments.

FIG. 5 shows a flowchart illustrating an example of method 500 for producing DQIs for phase-based distance estimation using narrowband radios. In various embodiments, method 500 may be performed by device 700 shown in FIG. 7, at least in part, in response to the execution of program instructions stored in a memory.

At 501, method 500 includes transmitting, by a device (e.g., initiator device 101), a first signal to another device (e.g., reflector device 102). At 502, method 500 includes receiving, by the first device, a second signal from the other device. At 503, method 500 includes calculating an FFT of IQ signals transmitted between the device and the other device based upon measurements of the second signal obtained by the device concatenated with measurements of the first signal obtained by the other device.

At 504, method 500 includes estimating a distance between the device and the other device based, at least in part, upon the FFT. At 505, method 500 includes selecting a spectral lobe of the FFT. Then, at 506, method 500 includes determining a DQ corresponding to the distance based, at least in part, upon an evaluation of the spectral lobe.

Figure 6A:
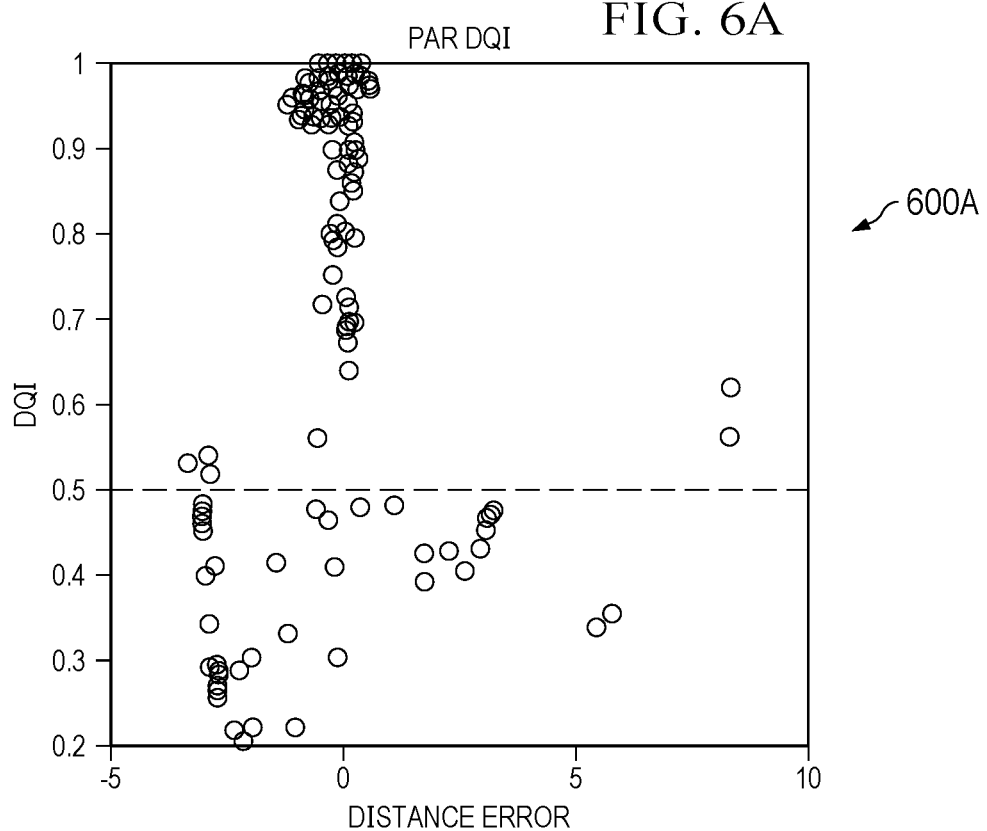
FIGS. 6A-D show graphs illustrating examples of DQIs in LOS and NLOS scenarios using Peak-to-Average Ratio (PAR) and Sinc-fit techniques, according to various embodiments.
Figure 6B:
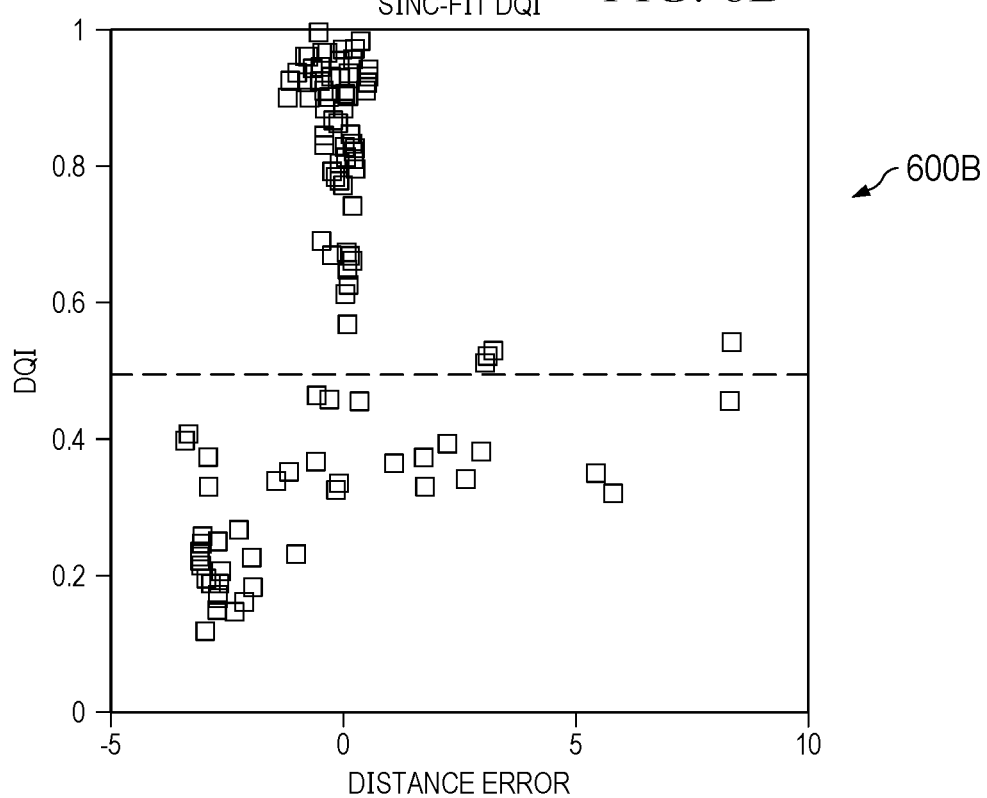
Figure 6C:
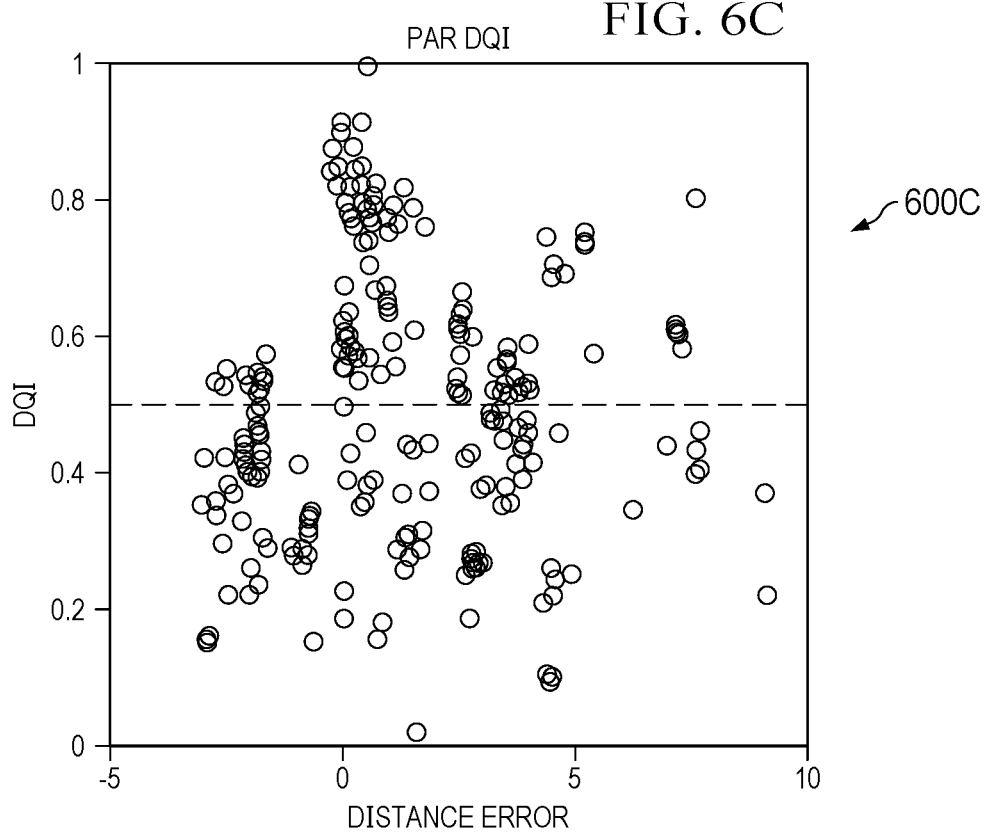
Figure 6D:
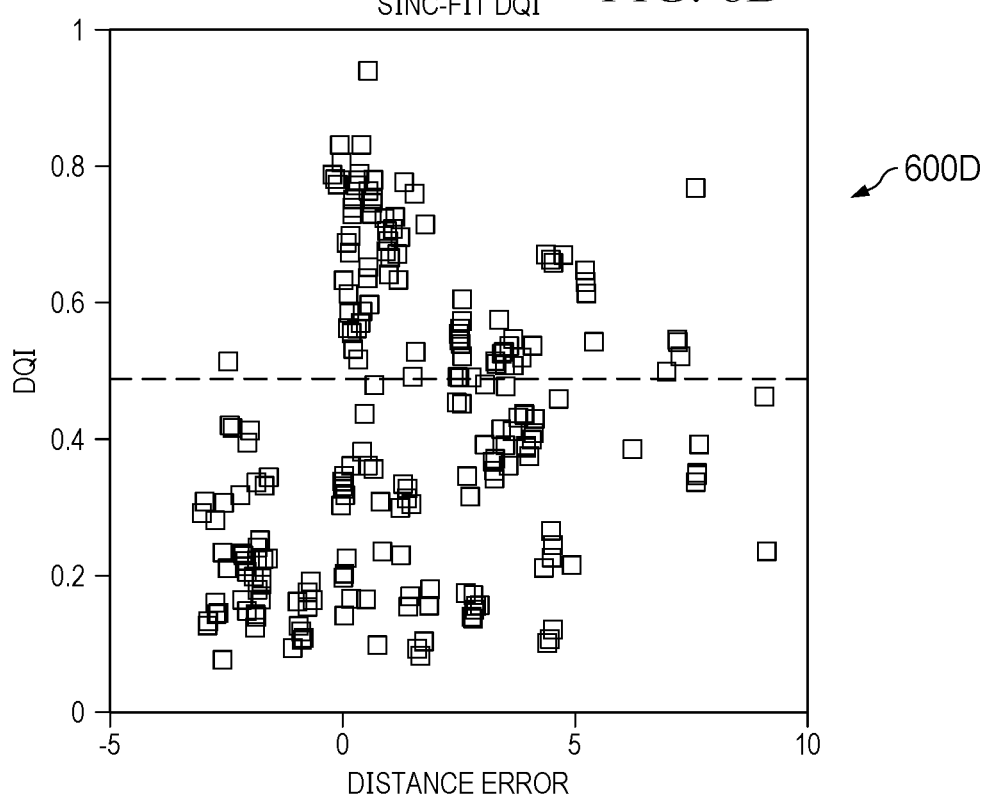

FIGS. 6A-D show graphs 600A-D illustrating examples of DQIs in LOS and NLOS scenarios using Peak-to-Average Ratio (PAR) and Sinc-fit techniques, according to various embodiments. Particularly, graph 600A of FIG. 6A shows a plot of distance errors (x-axis) against DQ (y-axis) using PAR-based DQIs and graph 600B of FIG. 6B shows another plot of distance errors (x axis) against DQ (y-axis) using Sinc-fit-based DQIs, both in LOS scenarios. Meanwhile, graph 600O of FIG. 6C shows a plot of distance errors against DQ using PAR-based DQIs and graph 600D of FIG. 6D shows another plot of distance errors against DQ using Sinc-fit-based DQIs, both in NLOS scenarios.

Graphs 600A-D show the relationship between distance error and DQ in an indoor environment, LOS and NLOS, to illustrate an application where DQIs may be used to filter out negative error distance estimates. From graphs 600A and 600B, it may be observed that for LOS the DQ is less than 0.5 for the negative distance errors and for most the positive ones. For NLOS scenarios of graphs 600O and 600D, it is harder to detect large distance errors, but the negative errors can still be reliably rejected. Sinc-fit-based DQ performs better in rejecting the negative errors in NLOS channels, as shown in graph 600D.

Specifically, PAR-based DQ may filter out approximately 18% of all the distance measurements for LOS, as shown in graph 600A, and 50% of all the measurements for NLOS, as shown in graph 600O. Conversely, Sinc-fit based DQ may filter out 18% of all the distance measurements for LOS, as shown in graph 600B, and 60% of all the measurements for NLOS, as shown in graph 600D. As such, DQIs as described above may be used to filter out the negative errors and part of the large positive ones, thus providing a significant benefit from a security perspective.

In low-reflective environments the separation between good and bad distance measurements is good, meaning that a DQ can successfully detect a situation where the SNR is low, or the input samples contain significant interference (e.g., a common case is WiFi interference). In dense multi-path environments (high-reflective), less separation is provided but successive DQ measurements help assess whether the environment is strongly multipath.

As such, systems and methods described herein provide techniques for computing a quality indication associated with an overall, phase-based distance estimate or measurement, without prior knowledge of the true position of the initiator or reflector devices. These systems and methods use the shape of an FFT magnitude curve, or transfer function, computed on a channel sounding, phase-based vector to determine the quality of a distance being estimated.

A DQ may be computed and associated to a distance measurement obtained via an FFT-based algorithm. An implementation of these systems and methods may be achieved with a low-complexity, low-cost narrowband radio system that uses a multi-carrier, phase-based approach to collect channel sounding information used by a distance estimation algorithm. These algorithms and methods have low processing and memory requirements and may be implemented on low-power microcontroller (MCU) architectures.

Although an illustrative application of these systems and methods is narrowband localization, these techniques may also be applied to any other type of localization system which uses correlation-based or FFT-based distance estimation algorithms. Furthermore, these systems and methods may be implemented in software, hardware, or a combination of both.

Figure 7:
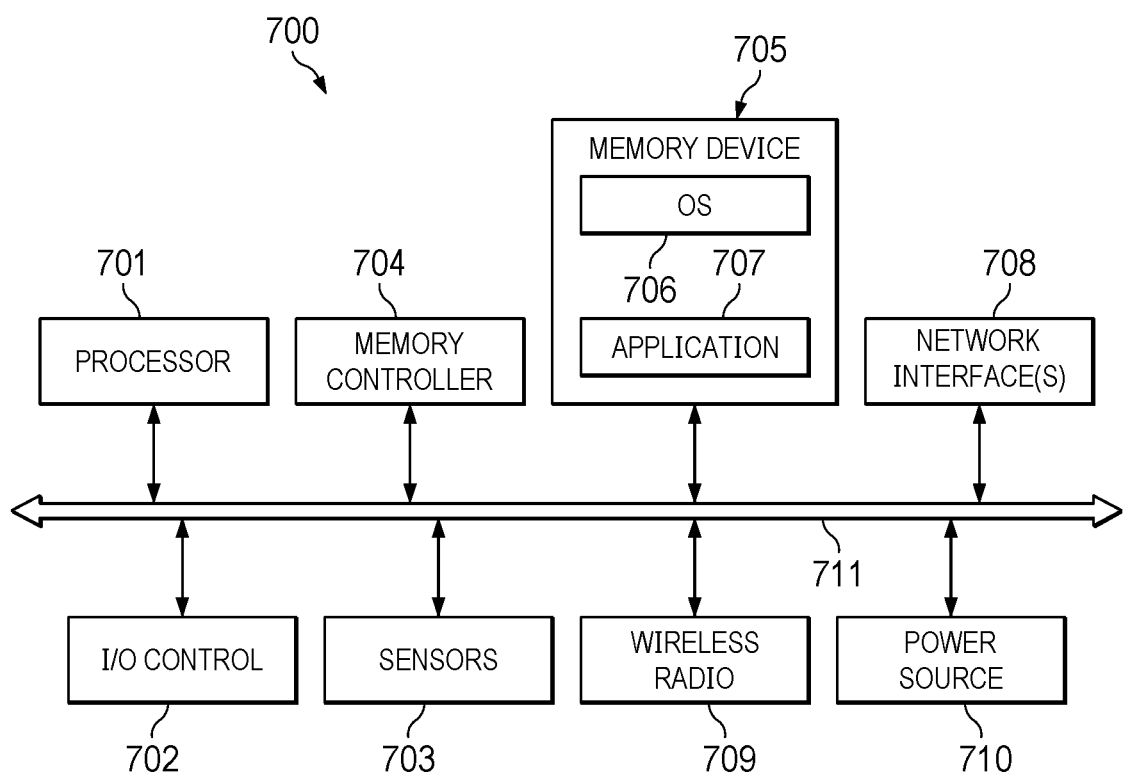
FIG. 7 illustrates an example of a device configured to implement systems and methods described herein, according to various embodiments.

FIG. 7 illustrates an example of device 700 that may be implemented as initiator device 101 or reflector device 102. In various embodiments, device 700 may be integrated with electronic circuitry, microprocessors, memory, input output (I/O) logic control, communication interfaces and components, as well as other hardware, firmware, and/or software to implement initiator device 101 or reflector device 102.

Device 700 includes processor 701 (e.g., a controller, a microcontroller, a digital signal processor, etc.) configured to execute program instructions stored in memory device 705 for implementing various systems and methods described herein. Processor 701 may include components of an integrated circuit, programmable logic device, a logic device formed using one or more semiconductors, and other implementations in silicon and/or hardware, such as a processor and memory system implemented as a system-on-chip (SoC).

In some cases, processor 701 may include two units: (i) a low-power microprocessor, core, or domain, and (ii) a high-power microprocessor, core, or domain. The high-power microprocessor may execute computationally intensive operations, whereas the low-power microprocessor may manage simpler processes, such as detecting inputs from one or more sensors. The low-power processor may also wake or initialize the high-power processor for computationally intensive processes.

In device 700, data bus 711 couples its various components and enable data communication between those components. Data bus 711 may be implemented as any suitable combination of one or more bus structures and/or bus architectures. Device 700 also includes power source 710, such as a battery and/or an AC-DC power supply.

Sensors 703 may be implemented to detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio frequency (RF), other electromagnetic signals or fields, or the like. As such, sensors 703 may include any one or a combination of temperature sensors, humidity sensors, hazard-related sensors, other environmental sensors, accelerometers, microphones, optical sensors up to and including cameras (e.g., charged coupled-device or video cameras, active or passive radiation sensors, GPS receivers, and RF identification (ID) detectors).

Memory controller 704 and memory device 705 may implement any type of nonvolatile memory and/or other suitable electronic storage device. Device 700 may include various firmware and/or software, such as Operating System (OS) 706 maintained as computer executable instructions in memory 705 and executed by processor 701. Moreover, application 707 may include a distance estimation application that implements various aspects of the systems and methods described herein.

Input-output (I/O) control 702 may be configured to receive input from a user and/or provide information to the user. For example, I/O control 702 may also include mechanical or virtual components that respond to a user input. For example, the user can mechanically move a sliding or rotatable component, or the motion along a touchpad may be detected, and may correspond to a setting of device 700.

Device 700 includes network interfaces 708, such as a mesh network interface for communication with other devices in a wireless mesh network, and an external network interface for network communication, such as via the Internet. Wireless radio system 709 may be used for wireless communication with other devices via network interface 708 and for multiple, different wireless communications systems. For instance, radio system 709 may include a radio device, antenna, and chipset implemented for any given wireless communications technology, such as, for example, Wi-Fi, BLUETOOTH, Mobile Broadband, BLE, point-to-point IEEE 802.15.4, etc.

In an illustrative, non-limiting embodiment, a device may include: a processor; and a memory coupled to the processor, the memory having program instructions stored thereon that, upon execution by the processor, cause the device to: measure a transfer function of an RF channel between the device and another device using narrowband radios; estimate a distance between the device and the other device based, at least in part, upon the transfer function; and determine a DQ corresponding to the distance based, at least in part, upon an evaluation of a spectral lobe of the transfer function.

To measure the transfer function, the program instructions, upon execution by the processor, may cause the device to: calculate an FFT of IQ signals transmitted between the device and the other device; and select a peak of the FFT as the spectral lobe. Moreover, to calculate the FFT, the program instructions, upon execution by the processor, may further cause the device to: transmit a first signal to the other device; receive a second signal from the other device; and calculate the FFT based upon measurements of the second signal obtained by the device concatenated with measurements of the first signal obtained by the other device.

The first and second signals may have a same frequency. The narrowband radios may operate in a 2.4 GHz band. The program instructions, upon execution by the processor, may cause the device to repeat the transmission and reception for at least another frequency. The frequency and the other frequency may be 1 MHz apart.

To evaluate the spectral lobe, the program instructions, upon execution by the processor, may cause the device to evaluate a shape of the spectral lobe. To evaluate the shape of the spectral lobe, the program instructions, upon execution by the processor, may cause the device to calculate a magnitude PAR of the FFT. To calculate the magnitude PAR, the program instructions, upon execution by the processor, may cause the device to: select an interval around the distance; compute an average magnitude of FFT outputs within the interval; compute a peak-to-average value of the FFT outputs; and normalize the peak-to-average value.

Additionally, or alternatively, to evaluate the shape of the spectral lobe, the program instructions, upon execution by the processor, may cause the device to calculate a fitting error between the spectral lobe and a Sinc function. To calculate the fitting error, the program instructions, upon execution, may cause the device to: select an interval around the distance; compute a Sinc function centered at the distance; compute an error between FFT outputs and the Sinc function; and normalize the error.

The program instructions, upon execution by the processor, may cause the device to characterize the distance as inaccurate in response to the DQ being below a threshold value. In some cases, in response to the characterization, the device may not respond to a command issued by the other device. The may include a motor vehicle, and the other device may include a key fob, smartphone, tablet, or laptop.

The program instructions, upon execution by the processor, may also cause the device to: estimate another distance between the device and the other device; determine another DQ associated with the other distance; and calculate an average distance between the device and the other device based upon an average between the distance weighted by the DQ and the other distance weighted by the other DQ.

In another illustrative, non-limiting embodiment, a memory storage device may have program instructions stored thereon that, upon execution by a processor of a device, cause the device to: transmit a first RF tone to another device; receive a second RF tone from the other device; calculate a distance between the device and the other device, at least in part, using an FFT of measurements of the second RF tone obtained by the device concatenated with measurements of the first RF tone obtained by the other device; calculate a DQ, at least in part, through an evaluation of a shape of a peak of the FFT, where the peak is selected among other peaks as corresponding to the distance; and characterize the distance as accurate or inaccurate, at least in part, in response to the DQ being above or below a threshold value. To evaluate the shape of the peak of the FFT, the program instructions, upon execution by the processor, may cause the device to calculate at least one of: a magnitude PAR of the FFT, or a fitting error between the peak and a Sinc function.

In yet another illustrative, non-limiting embodiment, a method may include: receiving, by a first device, a command from a second device; estimating, by the first device, a distance between the first device and the second device, at least in part, by calculating an FFT of IQ signals transmitted between the first device and the second device; calculating, by the first device, a DQ, at least in part, based upon an evaluation of a shape of a peak of the FFT, where the peak corresponds to the distance; and determining, by the first device, whether or how to respond to the command, at least in part, based upon the DQ1. For example, the first device may include a motor vehicle, and the second device may include a key fob, smartphone, tablet, or laptop.

In many implementations, systems and methods described herein may be incorporated into a wide range of electronic devices including, for example, computer systems or Information Technology (IT) products such as servers, desktops, laptops, memories, switches, routers, etc.; telecommunications hardware; consumer devices or appliances such as mobile phones, tablets, wearable devices, Internet-of-Things (IoT) devices, television sets, cameras, sound systems, etc.; scientific instrumentation; industrial robotics; medical or laboratory electronics such as imaging, diagnostic, or therapeutic equipment, etc.; transportation vehicles such as automobiles, buses, trucks, trains, watercraft, aircraft, etc.; military equipment, etc. More generally, these systems and methods may be incorporated into any device or system having one or more electronic parts or components.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. A device, comprising:
a processor; and
a memory coupled to the processor, the memory having program instructions stored thereon that, upon execution by the processor, cause the device to:
measure a transfer function of a radio frequency (RF) channel between the device and another device using narrowband radios;
estimate a distance between the device and the other device based, at least in part, upon the transfer function; and
determine a Distance Quality Indicator (DQ) corresponding to the distance based, at least in part, upon an evaluation of a spectral lobe of the transfer function.

2. The device of claim 1, wherein to measure the transfer function, the program instructions, upon execution by the processor, further cause the device to:
calculate a Fast Fourier Transform (FFT) of In-phase and Quadrature (IQ) signals transmitted between the device and the other device; and
select a peak of the FFT as the spectral lobe.

3. The device of claim 2, wherein to calculate the FFT, the program instructions, upon execution by the processor, further cause the device to:
transmit a first signal to the other device;
receive a second signal from the other device; and calculate the FFT based upon measurements of the second signal obtained by the device concatenated with measurements of the first signal obtained by the other device.

4. The device of claim 3, wherein the first and second signals have a same frequency.

5. The device of claim 4, wherein the narrowband radios operate in a 2.4 GHz band.

6. The device of claim 4, wherein the program instructions, upon execution by the processor, further cause the device to repeat the transmission and reception for at least another frequency.

7. The device of claim 6, wherein the frequency and the other frequency are 1 MHz apart.

8. The device of claim 2, wherein to evaluate the spectral lobe, the program instructions, upon execution by the processor, further cause the device to evaluate a shape of the spectral lobe.

9. The device of claim 8, wherein to evaluate the shape of the spectral lobe, the program instructions, upon execution by the processor, further cause the device to calculate a magnitude Peak-to-Average Ratio (PAR) of the FFT.

10. The device of claim 9, wherein to calculate the magnitude PAR, the program instructions, upon execution by the processor, further cause the device to:
select an interval around the distance;
compute an average magnitude of FFT outputs within the interval;
compute a peak-to-average value of the FFT outputs; and
normalize the peak-to-average value.

11. The device of claim 8, wherein to evaluate the shape of the spectral lobe, the program instructions, upon execution by the processor, further cause the device to calculate a fitting error between the spectral lobe and a Sinc function.

12. The device of claim 11, wherein to calculate the fitting error, the program instructions, upon execution, further cause the device to:
select an interval around the distance;
compute a Sinc function centered at the distance;
compute an error between FFT outputs and the Sinc function; and
normalize the error.

13. The device of claim 1, wherein the program instructions, upon execution by the processor, further cause the device to characterize the distance as inaccurate in response to the DQ1 being below a threshold value.

14. The device of claim 13, wherein the program instructions, upon execution by the processor, further cause the device to, in response to the characterization, not respond to a command issued by the other device.

15. The device of claim 14, wherein the device comprises a motor vehicle, and wherein the other device comprises a key fob, smartphone, tablet, or laptop.

16. The device of claim 1, wherein the program instructions, upon execution by the processor, further cause the device to:
estimate another distance between the device and the other device;
determine another DQ associated with the other distance; and
calculate an average distance between the device and the other device based upon an average between the distance weighted by the DQ and the other distance weighted by the other DQ.

17. A memory storage device having program instructions stored thereon that, upon execution by a processor of a device, cause the device to:
transmit a first radio frequency (RF) tone to another device;
receive a second RF tone from the other device;
calculate a distance between the device and the other device, at least in part, using a Fast Fourier Transform (FFT) of measurements of the second RF tone obtained by the device concatenated with measurements of the first RF tone obtained by the other device;
calculate a Distance Quality Indicator (DQ), at least in part, through an evaluation of a shape of a peak of the FFT, wherein the peak is selected among other peaks as corresponding to the distance; and
characterize the distance as accurate or inaccurate, at least in part, in response to the DQ being above or below a threshold value.

18. The memory storage device of claim 17, wherein to evaluate the shape of the peak of the FFT, the program instructions, upon execution by the processor, further cause the device to calculate at least one of: a magnitude Peak-to-Average Ratio (PAR) of the FFT, or a fitting error between the peak and a Sinc function.

19. A method, comprising:
receiving, by a first device, a command from a second device;
estimating, by the first device, a distance between the first device and the second device, at least in part, by calculating a Fast Fourier Transform (FFT) of In-phase and Quadrature (IQ) signals transmitted between the first device and the second device;
calculating, by the first device, a Distance Quality Indicator (DQI), at least in part, based upon an evaluation of a shape of a peak of the FFT, wherein the peak corresponds to the distance; and
determining, by the first device, whether or how to respond to the command, at least in part, based upon the DQI.

20. The method of claim 19, wherein the first device comprises a motor vehicle, and wherein the second device comprises a key fob, smartphone, tablet, or laptop.

* * * * *